(12) United States Patent
Ohtsuki et al.

(10) Patent No.: US 11,248,306 B2
(45) Date of Patent: Feb. 15, 2022

(54) ANODIC-OXIDATION EQUIPMENT, ANODIC-OXIDATION METHOD, AND METHOD FOR PRODUCING CATHODE OF ANODIC-OXIDATION EQUIPMENT

(71) Applicant: SHIN-ETSU HANDOTAI CO., LTD., Tokyo (JP)

(72) Inventors: Tsuyoshi Ohtsuki, Annaka (JP); Masaro Tamatsuka, Nishigo-mura (JP)

(73) Assignee: SHIN-ETSU HANDOTAI CO., LTD., Tokyo (JP)

( * ) Notice: Subject to any disclaimer, the term of this patent is extended or adjusted under 35 U.S.C. 154(b) by 0 days.

(21) Appl. No.: 17/052,562

(22) PCT Filed: Apr. 2, 2019

(86) PCT No.: PCT/JP2019/014575
§ 371 (c)(1),
(2) Date: Nov. 3, 2020

(87) PCT Pub. No.: WO2019/235047
PCT Pub. Date: Dec. 12, 2019

(65) Prior Publication Data
US 2021/0238762 A1 Aug. 5, 2021

(30) Foreign Application Priority Data
Jun. 6, 2018 (JP) .............................. JP2018-108344

(51) Int. Cl.
*C25D 11/02* (2006.01)
*C25D 17/12* (2006.01)
(Continued)

(52) U.S. Cl.
CPC ............ *C25D 11/005* (2013.01); *C25D 11/02* (2013.01); *C25D 11/32* (2013.01); *C25D 17/12* (2013.01)

(58) Field of Classification Search
CPC ......................... C25D 11/32; C25D 11/00–02
See application file for complete search history.

(56) References Cited

U.S. PATENT DOCUMENTS

| 4,353,936 A * | 10/1982 | Nozaki ............... H01L 21/3185 |
|---|---|---|
| | | 438/694 |
| 6,033,928 A | 3/2000 | Eriguchi et al. |
| 2017/0067850 A1 | 3/2017 | Momose et al. |

FOREIGN PATENT DOCUMENTS

| JP | H08-083940 A | 3/1996 |
|---|---|---|
| JP | 2003-129292 A | 5/2003 |

(Continued)

OTHER PUBLICATIONS

May 14, 2019 International Search Report issued in International Patent Application No. PCT/JP2019/014575.

*Primary Examiner* — Ho-Sung Chung
(74) *Attorney, Agent, or Firm* — Oliff PLC

(57) ABSTRACT

An anodic-oxidation equipment for forming a porous layer on a substrate to be treated, including: an electrolytic bath filled with an electrolytic solution; an anode and a cathode disposed in the electrolytic solution; and a power supply for applying current between the anode and the cathode in the electrolytic solution, wherein the anode is the substrate to be treated, and the cathode is a silicon substrate having a surface on which a nitride film is formed. This provides a cathode material in anodic-oxidation for forming porous silicon by an electrochemical reaction in an HF solution, the cathode material having a resistance to electrochemical reaction in an HF solution and no metallic contamination, etc., and furthermore, being less expensive than a conventional cathode material. Furthermore, high-quality porous silicon is provided at a lower cost than has been conventional.

6 Claims, 2 Drawing Sheets

(51) Int. Cl.
*C25D 11/32* (2006.01)
*C25D 11/00* (2006.01)

(56) References Cited

FOREIGN PATENT DOCUMENTS

| | | |
|---|---|---|
| JP | 2005-093664 A | 4/2005 |
| JP | 2008-071782 A | 3/2008 |
| JP | 2011-026638 A | 2/2011 |
| JP | 2018-065734 A | 4/2018 |
| WO | 2015/189889 A1 | 12/2015 |

* cited by examiner

[FIG. 1]
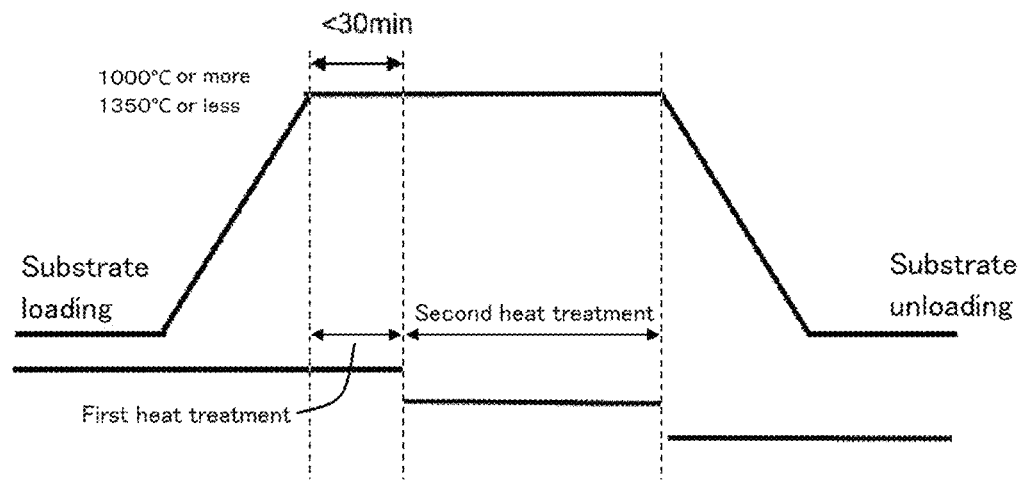
[FIG. 2]
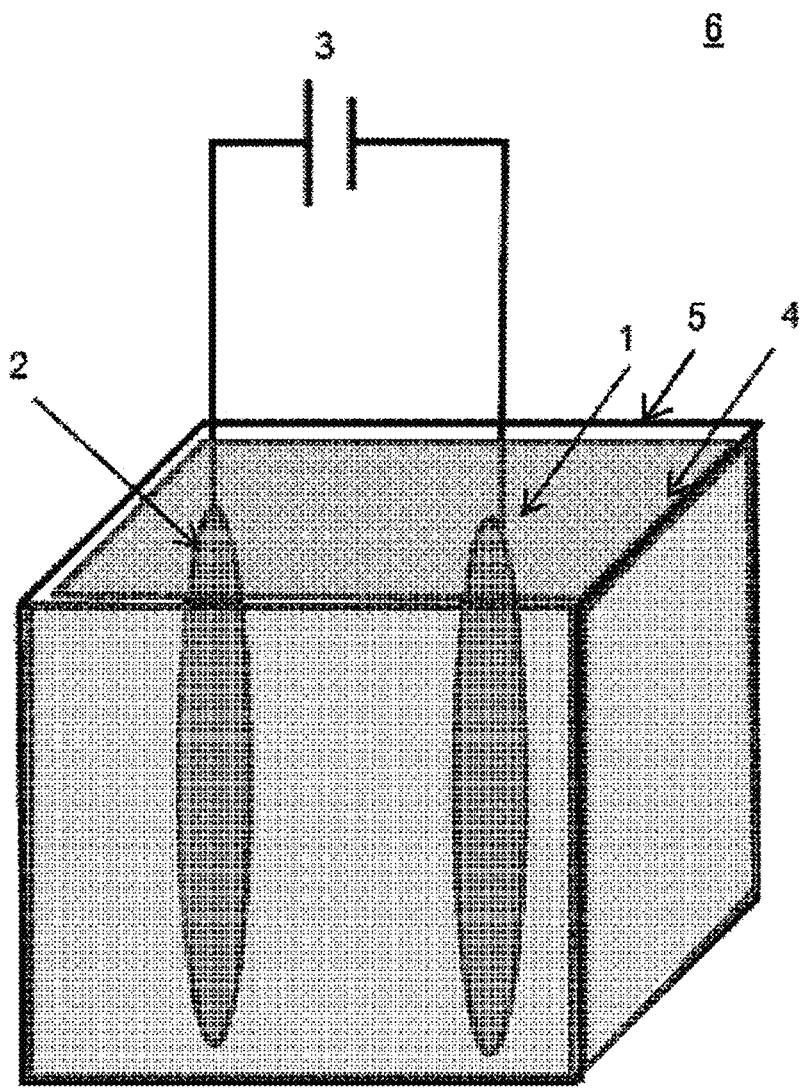

[FIG. 3]
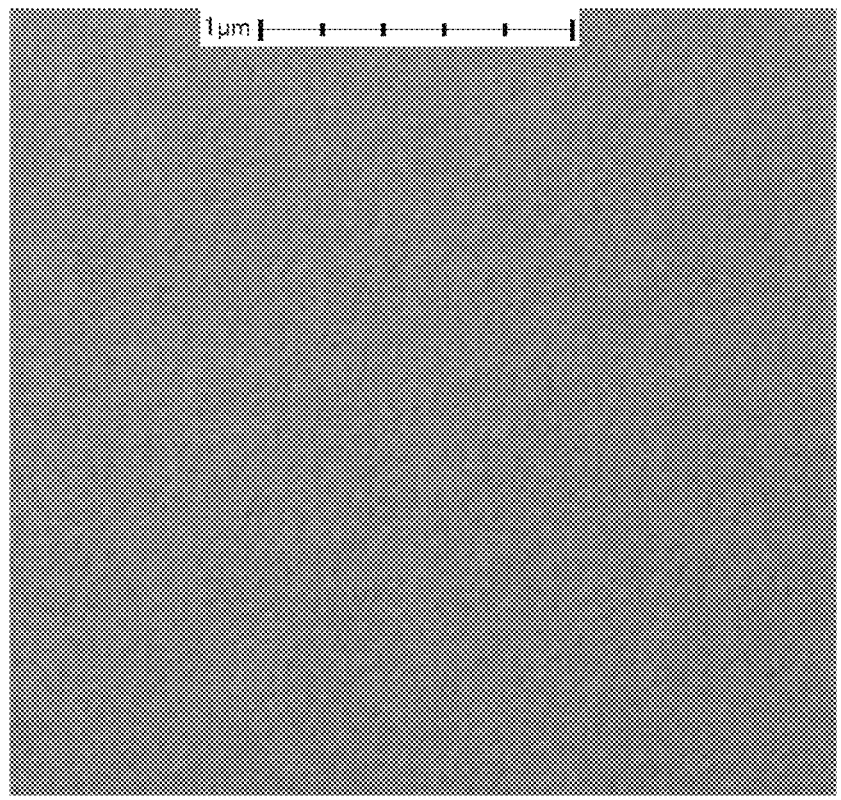
[FIG. 4]
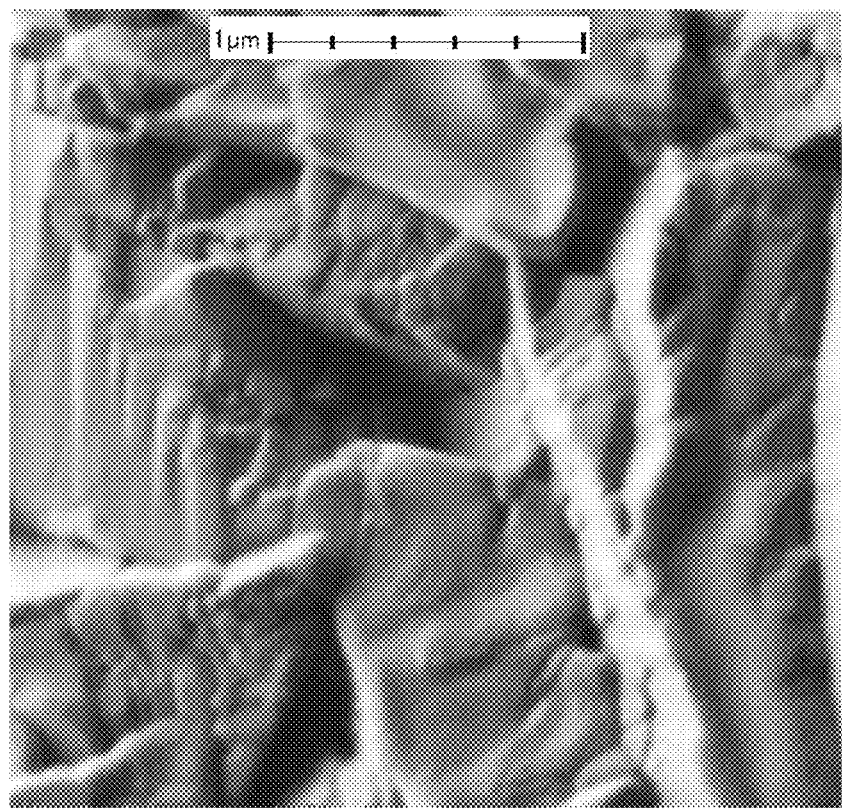

ANODIC-OXIDATION EQUIPMENT, ANODIC-OXIDATION METHOD, AND METHOD FOR PRODUCING CATHODE OF ANODIC-OXIDATION EQUIPMENT

TECHNICAL FIELD

The present invention relates to: an anodic-oxidation equipment; an anodic-oxidation method; and a method for producing a cathode of an anodic-oxidation equipment.

BACKGROUND ART

Porous silicon makes it possible to enlarge the surface area of silicon, and is used for various purposes. For example, Patent Document 1 discloses a use as a gas sensor for detecting gas of molecules containing nitrogen.

For uses other than the gas sensor, porous silicon is regarded as promising for an electrode material of batteries, and is attracting attention in recent years, and various uses are disclosed and suggested (Patent Document 2).

In addition, uses as a device structure that uses the fine structure of silicon that has become porous (FET) (Patent Document 3) or as a light-emitting device (Patent Document 4), etc. are also suggested.

Thus, porous silicon is expected to be used for a wide range of uses. Porous silicon is generally formed by anodic-oxidation (for example, Patent Document 5). Specifically, porous silicon is formed by disposing a silicon substrate for forming porous on the anode side and a metal electrode on the cathode side in a hydrofluoric acid solution and employing an electrochemical reaction. As a cathode material, platinum or a metal with a high conductivity such as copper having a platinum plating is used, considering resistance to HF.

To form a porous layer on the silicon substrate on the anode side uniformly over the entire surface of the substrate, the opposing cathode also needs to be an electrode with a similar size. For this purpose, an electrode with a comparatively large area is needed.

Forming such an electrode with a large area with platinum is extremely expensive. On the other hand, in the case with the plating, hydrofluoric acid seeps in through gaps in the plating layer, and etches the underlying metal. If this happens, not only is the cathode material degraded, but also porous silicon formed by the anodic-oxidation is contaminated by metal due to impurities dissolving into the chemical solution, leading to degradation of characteristics when a sensor or an FET is subsequently formed.

As described, since hydrofluoric acid is used for anodic-oxidation, choice of cathode material is extremely difficult. There are methods of using carbon or silicon, which appear not to become etched, but in the case of carbon, impurities are liable to dissolve, and in the case of silicon, silicon dissolves into the chemical solution, and fluctuation of anodic-oxidation rate occurs.

Particularly in device application, for example, Patent Document 6 suggests covering a metal such as platinum with silicon, carbon, or a nonmetallic resin to obtain an electrode material as an anodic-oxidation method with little metallic contamination. Contamination can be reduced by covering in this manner. However, this covering is a method of inserting the metal electrode into silicon or other materials, and there are concerns that an operation of inserting is necessary before the anodic-oxidation treatment, and seeping of the chemical solution from the insertion part, etc. In addition, electrochemical reaction in an HF solution is an extremely severe condition, and there are concerns for roughening of the surface or seeping of contained substances, etc. even with these materials.

CITATION LIST

Patent Literature

Patent Document 1: WO 2015/189889 A1
Patent Document 2: JP 2018-065734 A
Patent Document 3: JP 2005-093664 A
Patent Document 4: JP H08-083940 A
Patent Document 5: JP 2008-71782 A
Patent Document 6: JP 2011-26638 A

SUMMARY OF INVENTION

Technical Problem

As described above, there are expectations for porous silicon in various uses. However, in order to obtain high-quality porous silicon, it is necessary to obtain a cathode having a resistance to electrochemical reaction in an HF solution and having no metallic contamination, etc. Furthermore, there is a problem that an inexpensive cathode material cannot be procured.

The present invention has been made in view of the above-described problems, and an object thereof is to provide a cathode material in anodic-oxidation for forming porous silicon by an electrochemical reaction in an HF solution, the cathode material having a resistance to electrochemical reaction in an HF solution and no metallic contamination, etc., and furthermore, being less expensive than a conventional cathode material. It is also an object of the present invention to provide high-quality porous silicon at a lower cost than has been conventional.

Solution to Problem

To achieve the object, the present invention provides an anodic-oxidation equipment for forming a porous layer on a substrate to be treated, comprising:
an electrolytic bath filled with an electrolytic solution;
an anode and a cathode disposed in the electrolytic solution; and
a power supply for applying current between the anode and the cathode in the electrolytic solution,
wherein
the anode is the substrate to be treated, and
the cathode is a silicon substrate having a surface on which a nitride film is formed.

Such an anodic-oxidation equipment has a cathode which is a silicon substrate having a surface on which a nitride film is formed. Therefore, the cathode has a resistance to electrochemical reaction in an HF solution, has no metallic contamination, etc., and furthermore, is inexpensive. Thus, a high-quality porous silicon can be produced at a lower cost than has been conventional.

Furthermore, in this event, the cathode is preferably a silicon substrate having a surface from which a natural oxide film is removed and on which a nitride film is formed.

With such a cathode, a high-quality porous silicon can be produced at a lower cost than has been conventional more certainly.

In addition, the present invention provides an anodic-oxidation method for applying current between an anode and a cathode in an electrolytic solution to form a porous layer on a substrate to be treated disposed in the electrolytic solution, wherein the substrate to be treated is used as the anode and a silicon substrate having a surface on which a nitride film is formed is used as the cathode.

In such an anodic-oxidation method, a silicon substrate having a surface on which a nitride film is formed is used as the cathode. Therefore, the cathode has a resistance to electrochemical reaction in an HF solution, has no metallic contamination, etc., and furthermore, is inexpensive. Thus, according to the anodic-oxidation method, a high-quality porous silicon can be produced at a lower cost than has been conventional.

Furthermore, in this event, a silicon substrate, which is obtained by removing a natural oxide film from a surface of a silicon substrate by a heat treatment in a non-oxidizing gas atmosphere other than a nitrogen gas atmosphere, and then forming a nitride film on the surface by a heat treatment in a nitriding gas atmosphere, is preferably used as the silicon substrate having the surface on which the nitride film is formed.

In this manner, when a silicon substrate with a nitride film formed on a surface from which a natural oxide film has been removed is used as the cathode, a high-quality porous silicon can be produced at a lower cost than has been conventional with more certainty.

In addition, the present invention provides a method for producing a cathode of an anodic-oxidation equipment, wherein a silicon substrate is introduced into a heat treatment furnace, a temperature is raised to 1000° C. or more and 1350° C. or less, a first heat treatment is performed for less than 30 minutes in an atmosphere of a non-oxidizing gas other than a nitrogen gas at the raised temperature to remove a natural oxide film on a surface of the silicon substrate, and then a second heat treatment is performed with a nitriding gas atmosphere inside the heat treatment furnace to form a nitride film on the surface of the silicon substrate.

Such a method for producing a cathode of an anodic-oxidation equipment makes it possible to produce a cathode of an anodic-oxidation equipment that has a resistance to electrochemical reaction in an HF solution and has no metallic contamination, etc. at a lower cost than has been conventional.

Furthermore, in this event, an $H_2$ gas, an Ar gas, or a mixed gas thereof is preferably used as the non-oxidizing gas in the first heat treatment.

When the non-oxidizing gas in the first heat treatment is such a gas, it is possible to remove a natural oxide film more certainly and to produce a cathode of an anodic-oxidation equipment that has a resistance to electrochemical reaction in an HF solution and has no metallic contamination, etc. at a lower cost than has been conventional.

Advantageous Effects of Invention

As described above, in the anodic-oxidation equipment according to the invention and anodic-oxidation method according to the invention, a silicon substrate having a surface on which a nitride film is formed is used as a cathode. Therefore, the cathode has a resistance to electrochemical reaction in an HF solution, has no metallic contamination, etc., and furthermore, is inexpensive. Thus, a high-quality porous silicon can be produced at a lower cost than has been conventional.

In addition, the method for producing a cathode of an anodic-oxidation equipment according to the invention makes it possible to produce a cathode of an anodic-oxidation equipment that has a resistance to electrochemical reaction in an HF solution and has no metallic contamination, etc. at a lower cost than has been conventional.

BRIEF DESCRIPTION OF DRAWINGS

FIG. 1 is a diagram showing an example of a heat treatment sequence in the production of a cathode of an anodic-oxidation equipment according to the present invention.

FIG. 2 is a schematic view showing an example of an anodic-oxidation equipment according to the present invention.

FIG. 3 is an SEM image of the surface of the cathode material after the anodic-oxidation treatment in the Example.

FIG. 4 is an SEM image of the surface of the cathode material after the anodic-oxidation treatment in Comparative Example 1.

DESCRIPTION OF EMBODIMENTS

As described above, there are expectations for porous silicon in various uses, but to obtain high-quality porous silicon, it is necessary to obtain a cathode having a resistance to electrochemical reaction in an HF solution and having no metallic contamination, etc. Furthermore, an inexpensive cathode material cannot be procured. Therefore, an anodic-oxidation equipment that can produce high-quality porous silicon at a lower cost than has been conventional has been desired.

The present inventors have earnestly studied the above-described problems, and found out that by using a silicon substrate with a nitride film formed, the nitride film being a passive film that has a high resistance to hydrofluoric acid and can resist an electrochemical reaction as the cathode of an anodic-oxidation equipment, high-quality porous silicon can be produced at a lower cost than has been conventional, and completed the present invention.

Hereinafter, the present invention will be described in detail, but the present invention is not limited thereto.

The present invention provides an anodic-oxidation equipment for forming a porous layer on a substrate to be treated, including:

an electrolytic bath filled with an electrolytic solution;
an anode and a cathode disposed in the electrolytic solution; and
a power supply for applying current between the anode and the cathode in the electrolytic solution,
wherein
the anode is the substrate to be treated, and
the cathode is a silicon substrate having a surface on which a nitride film is formed.

Such an anodic-oxidation equipment has a cathode which is a silicon substrate having a surface on which a nitride film is formed. Therefore, the cathode has a resistance to electrochemical reaction in an HF solution, has no metallic contamination, etc., and furthermore, is inexpensive. Thus, according to the anodic-oxidation equipment, a high-quality porous silicon can be produced at a lower cost than has been conventional.

Furthermore, in this event, the cathode is preferably a silicon substrate having a surface from which a natural oxide film is removed and on which a nitride film is formed.

Such a cathode does not have impurities that are contained in the natural oxide film, and has a firm and fine nitride film formed thereon, and therefore, a high-quality porous silicon can be produced at a lower cost than has been conventional with more certainty.

Here, the anodic-oxidation equipment according to the present invention will be described more specifically using FIG. 2. FIG. 2 is a schematic view showing an example of the anodic-oxidation equipment according to the present invention. In the anodic-oxidation equipment 6 according to the present invention, a silicon substrate as a substrate to be treated 2 (anode) and a cathode 1 are disposed in an electrolytic bath 5, where the electrolytic bath 5 is filled with an electrolytic solution 4 such as an HF solution, for example, so that the substrate to be treated 2 is completely immersed. As the cathode 1, a silicon substrate having the same shape as that of the substrate to be treated 2 and a surface on which a nitride film is formed is used. This prevents metallic contamination from the cathode.

A porous layer can be formed on the surface of the substrate to be treated 2 by connecting the substrate to be treated 2 and the cathode 1 through a power supply 3 as shown in FIG. 2 and applying current.

In addition, the present invention provides an anodic-oxidation method for applying current between an anode and a cathode in an electrolytic solution to form a porous layer on a substrate to be treated disposed in the electrolytic solution, wherein
    the substrate to be treated is used as the anode and a silicon substrate having a surface on which a nitride film is formed is used as the cathode.

In such an anodic-oxidation method, a silicon substrate having a surface on which a nitride film is formed is used as the cathode. Therefore, the cathode has a resistance to electrochemical reaction in an HF solution, has no metallic contamination, etc., and furthermore, is inexpensive. Thus, according to the anodic-oxidation method, a high-quality porous silicon can be produced at a lower cost than has been conventional.

Furthermore, in this event, a silicon substrate, which is obtained by removing a natural oxide film from a surface of a silicon substrate by a heat treatment in an atmosphere of a non-oxidizing gas other than a nitrogen gas, and then forming a nitride film on the surface by a heat treatment in a nitriding gas atmosphere, is preferably used as the silicon substrate having the surface on which the nitride film is formed.

When such a silicon substrate having a surface on which a nitride film is formed is used as the cathode, there are few impurities since the natural oxide film is removed, and adhesion of the nitride film to the silicon substrate is enhanced. Therefore, a high-quality porous silicon can be produced at a lower cost than has been conventional more certainly.

In addition, the present invention provides a method for producing a cathode of an anodic-oxidation equipment, wherein
    a silicon substrate is introduced into a heat treatment furnace, a temperature is raised to 1000° C. or more and 1350° C. or less, a first heat treatment is performed for less than 30 minutes in an atmosphere of a non-oxidizing gas other than a nitrogen gas at the raised temperature to remove a natural oxide film on a surface of the silicon substrate, and then a second heat treatment is performed with a nitriding gas atmosphere inside the heat treatment furnace to form a nitride film on the surface of the silicon substrate.

Such a method for producing a cathode of an anodic-oxidation equipment makes it possible to produce a cathode of an anodic-oxidation equipment that has a resistance to electrochemical reaction in an HF solution and has no metallic contamination, etc. at a lower cost than has been conventional.

The method for producing a cathode of an anodic-oxidation equipment according to the present invention will be described with reference to FIG. 1.

FIG. 1 is a diagram showing an example of a heat treatment sequence in the production of a cathode of an anodic-oxidation equipment according to the present invention. Firstly, a silicon substrate is introduced into a heat treatment furnace (substrate loading), the temperature is raised to 1000° C. or more and 1350° C. or less, and a treatment (first heat treatment) is performed for less than 30 minutes in an atmosphere of a non-oxidizing gas other than a nitrogen gas at the raised temperature. In this manner, the natural oxide film, etc. on the surface of the silicon substrate is removed so that impurities contained in the natural oxide film can be removed, and at the same time, the surface of the silicon substrate is activated. To "activate" described herein means to expose the dangling bonds of silicon rather than passivate the surface of the silicon substrate with hydrogen or oxygen. In addition, in this event, the time for performing the first heat treatment is not particularly limited as long as it is less than 30 minutes, but the treatment is preferably performed for 1 minute or more.

Next, the gas introduced into the heat treatment furnace is switched to a nitriding gas such as nitrogen for example, to form a nitride film on the activated surface of the silicon substrate (second heat treatment). In this manner, a fine and firm nitride film can be formed.

Subsequently, the temperature inside the heat treatment furnace is lowered, and the silicon substrate with the nitride film formed is taken out (substrate unloading).

An object of the non-oxidizing gas in the first heat treatment is to remove the natural oxide film, etc. from the surface, and the gas is preferably an $H_2$ gas, an Ar gas, or a mixed gas thereof. Generally, Ar is not explosive, and is therefore an easily-handled gas.

Using such a gas as the non-oxidizing gas in the first heat treatment make it possible to produce a cathode of an anodic-oxidation equipment that has a resistance to electrochemical reaction in an HF solution and has no metallic contamination, etc. at a lower cost than has been conventional with more certainty.

When a cathode material thus formed is used as the cathode material at the time of anodic-oxidation, anodic-oxidation can be performed without the cathode being degraded even when the cathode is used for a long time since the resistance to hydrofluoric acid of the nitride film formed at the high temperature is extremely high.

Should be noted that a nitride film is insulator film, but is thin and is to be used an anodic-oxidation in which a relatively high voltage is used, therefore, anodic oxidation using the nitride film can be performed even though there is a parasitic resistance component.

Should be noted, however, that in the present invention, generally, in order to achieve an anodic-oxidation similar to when the cathode is a platinum electrode, it is necessary to apply a higher voltage than in the case with a platinum electrode if the current value is to be the same, and the application time needs to be longer if the applied voltage is to be the same. However, specifically how much the change needs to be varies depending on the actual anodic-oxidation environment (conditions) such as thickness of the nitride film or electrolytic solution, etc., and therefore, it is desirable to perform a test beforehand.

Should be noted that it is sufficient for the nitride film to have a thickness of about 0.1 nm to 10 nm. The present invention is a method of directly nitriding silicon with nitrogen, and it is difficult to form an even thicker nitride film. The nitride film is preferably as thin as possible.

EXAMPLE

Hereinafter, the present invention will be described specifically with reference to an Example and Comparative Examples, but the present invention is not limited thereto.

Example

Firstly, a p-type silicon substrate (boron-doped and with a normal resistance) with a diameter of 200 mm was provided. The substrate was placed in a vertical furnace, and the temperature inside the furnace was raised from 800° C. to 1200° C. at 5° C./min. During this period, Ar gas was introduced at a flow rate of 10 L/min. After reaching 1200° C., annealing was performed for 10 min with the gas flow rate as it was without change (first heat treatment), and then the inside of the furnace was switched to a nitrogen gas and a treatment was performed for 10 min (second heat treatment). Subsequently, the gas was switched back to Ar gas, the temperature was lowered to 800° C. at a rate of 3° C./min, and the silicon substrate with a nitride film formed thereon was taken out. The thickness of the nitride film at this time was about 1 nm.

Next, the silicon substrate with the formed nitride film fabricated as described above was disposed in an anodic-oxidation equipment as shown in FIG. 2, and was used as a cathode at the time of anodic-oxidation. The substrate was immersed in a mixed solution of 50% HF:ethanol:water=1:1:1 (1 L each) in terms of the volume ratio. A p-type silicon substrate (with a normal resistance) with a diameter of 200 mm was used as an anode. Note that the distance between the two electrodes was set to 5 cm. In addition, the anodic-oxidation was performed by applying an electric current of 1.7 A for 30 min. After applying the electric current, porous silicon was formed on the silicon substrate on the anode side, and the thickness of the formed porous layer was 10 μm on observation by SEM.

The surface of the cathode material after the anodic-oxidation treatment was observed by SEM. FIG. 3 shows an SEM image of the surface of the cathode material after the anodic-oxidation treatment in the Example. When the surface of the silicon substrate with the nitride film formed of the present invention used as the cathode was observed by SEM after the anodic-oxidation treatment, no roughening of the surface, etc. was observed.

Comparative Example 1

A p-type silicon substrate (boron-doped and with a normal resistance) with a diameter of 200 mm was provided.

The substrate was disposed in an anodic-oxidation equipment and was used as a cathode at the time of anodic-oxidation with no particular treatment. The substrate was immersed in a mixed solution of 50% HF:ethanol:water=1:1:1 (1 L each) in terms of the volume ratio. A p-type silicon substrate (with a normal resistance) with a diameter of 200 mm was also used as an anode. Note that the distance between the two electrodes was set to 5 cm. In addition, the anodic-oxidation was performed by applying an electric current of 1.7 A for 20 min. After applying the electric current, porous silicon was formed on the anode side, and the thickness of the formed porous layer was 10 μm on observation by SEM.

The surface of the cathode material after the anodic-oxidation treatment was observed by SEM. FIG. 4 shows an SEM image of the surface of the cathode material after the anodic-oxidation treatment in Comparative Example 1. When the surface of the substrate used as the cathode was observed by SEM after the anodic-oxidation treatment, roughening of the surface due to electrochemical reaction was observed on the surface.

Comparative Example 2

A p-type silicon substrate (boron-doped and with a normal resistance) with a diameter of 200 mm was provided.

Using the substrate as an anode and platinum as a cathode, these were disposed in an anodic-oxidation equipment, and anodic-oxidation was performed. The substrate was immersed in a mixed solution of 50% HF:ethanol:water=1:1:1 (1 L each) in terms of the volume ratio. Note that the distance between the two electrodes was set to 5 cm. In addition, the anodic-oxidation was performed by applying an electric current of 1.7 A for 12 min. After applying the electric current, porous silicon was formed on the anode side, and the thickness of the formed porous layer was 10 μm on observation by SEM.

From a comparison of the Example and Comparative Example 1, after the anodic-oxidation treatment, roughening of the surface, etc. was not observed on the surface of the silicon substrate with the nitride film formed used as the cathode in the Example, whereas roughening of the surface due to electrochemical reaction was observed on the surface of the silicon substrate used as the cathode without any treatment in particular in Comparative Example 1. Accordingly, it was revealed that the silicon substrate used as the cathode without any particular treatment in Comparative Example 1 had no resistance to electrochemical reaction in an HF solution, silicon dissolved into the electrolytic solution, causing fluctuation of the anodic-oxidation rate, and that it was difficult to fabricate a high-quality porous silicon.

Furthermore, compared to using platinum (Comparative Example 2), when the silicon substrate with the nitride film formed according to the present invention was used as the cathode material (Example), it did take some time to obtain a porous silicon layer of the same thickness due to resistance of the electrode, but it was possible to fabricate an equivalent porous silicon.

Furthermore, there are problems of metallic contamination and high cost, etc. when platinum is used for the cathode (Comparative Example 2), whereas when a silicon substrate with a nitride film formed according to the present invention is used as the cathode material (Example), there are no concerns for metallic contamination, etc., and a high-quality porous silicon can be fabricated at a lower cost.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. An anodic-oxidation equipment for forming a porous layer on a substrate to be treated, comprising:
an electrolytic bath filled with an electrolytic solution;

an anode and a cathode disposed in the electrolytic solution; and a power supply for applying current between the anode and the cathode in the electrolytic solution, wherein the anode is the substrate to be treated, and the cathode is a silicon substrate having a surface on which a nitride film is formed.

2. The anodic-oxidation equipment according to claim 1, wherein the cathode is a silicon substrate having a surface from which a natural oxide film is removed and on which a nitride film is formed.

3. An anodic-oxidation method for applying current between an anode and a cathode in an electrolytic solution to form a porous layer on a substrate to be treated disposed in the electrolytic solution, wherein the substrate to be treated is used as the anode and a silicon substrate having a surface on which a nitride film is formed is used as the cathode.

4. The anodic-oxidation method according to claim 3, wherein a silicon substrate, which is obtained by removing a natural oxide film from a surface of a silicon substrate by a heat treatment in a non-oxidizing gas atmosphere other than a nitrogen gas atmosphere, and then forming a nitride film on the surface by a heat treatment in a nitriding gas atmosphere, is used as the silicon substrate having the surface on which the nitride film is formed.

5. A method for producing a cathode of an anodic-oxidation equipment, wherein a silicon substrate is introduced into a heat treatment furnace, a temperature is raised to 1000° C. or more and 1350° C. or less, a first heat treatment is performed for less than 30 minutes in an atmosphere of a non-oxidizing gas other than a nitrogen gas at the raised temperature to remove a natural oxide film on a surface of the silicon substrate, a second heat treatment is performed with a nitriding gas atmosphere inside the heat treatment furnace to form a nitride film on the surface of the silicon substrate, and the silicon substrate with the nitride film is used as the cathode of the anodic-oxidation equipment.

6. The method for producing a cathode of an anodic-oxidation equipment according to claim 5, wherein an $H_2$ gas, an Ar gas, or a mixed gas thereof is used as the non-oxidizing gas in the first heat treatment.

* * * * *